(12) United States Patent
Kuramori et al.

(10) Patent No.: US 6,843,286 B1
(45) Date of Patent: Jan. 18, 2005

(54) TIRE/WHEEL ASSEMBLY, RUN-FLAT SUPPORT MEMBER AND MANUFACTURING METHOD THEREFOR

(75) Inventors: Akira Kuramori, Hiratsuka (JP); Atsushi Tanno, Hiratsuka (JP); Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 41 days.

(21) Appl. No.: 10/601,539

(22) Filed: Jun. 24, 2003

(30) Foreign Application Priority Data

Jul. 5, 2002 (JP) ........................................ 2002-197626

(51) Int. Cl.[7] .......................... B60C 17/06; B29D 30/00; B29D 30/06

(52) U.S. Cl. ........................ 152/156; 152/158; 152/520; 156/110.1; 156/292; 156/304.2; 156/304.3; 156/304.5

(58) Field of Search ................................ 152/156, 158, 152/520, 248, 249; 156/110.1, 292, 304.2, 304.3, 304.5

(56) References Cited

U.S. PATENT DOCUMENTS 6,463,974 B1 * 10/2002 Hellweg et al. ......... 152/520 X
6,463,976 B1 * 10/2002 Glinz et al. .................. 152/520
6,619,350 B1 * 9/2003 Dieckmann et al. ........ 152/156
6,672,349 B1 * 1/2004 Glinz et al. .................. 152/156
2002/0195183 A1 * 12/2002 Glinz et al. .................. 152/400

FOREIGN PATENT DOCUMENTS

| DE | 37 33 515 A1 | * | 4/1989 | ................. 152/155 |
| DE | 101 61 365 A1 | * | 6/2003 | |
| GB | 2 204 841 A | * | 11/1988 | ................. 152/520 |
| JP | 10-297226 A1 | | 11/1998 | |
| JP | 2001-163020 A1 | | 6/2001 | |
| JP | 2001-519279 A1 | | 10/2001 | |

* cited by examiner

Primary Examiner—Adrienne C. Johnstone
(74) Attorney, Agent, or Firm—Rader, Fishman & Grauer PLLC

(57) ABSTRACT

A tire/wheel assembly in which a run-flat support member 3 is inserted into a cavity of a pneumatic tire 2, the run-flat support member 3 including a circular shell 4 in which the outer circumferential side thereof is used as a support surface and the inner circumferential side thereof is opened to have two leg portions, and an elastic ring 5 supporting the ends of the two leg portions on a rim 1. The circular shell 4 is configured by jointing side edges 7, 7 of at least two shell segments 4a, each having a single convex circumferential surface.

10 Claims, 3 Drawing Sheets

TIRE/WHEEL ASSEMBLY, RUN-FLAT SUPPORT MEMBER AND MANUFACTURING METHOD THEREFOR

BACKGROUND OF THE INVENTION

The present invention relates to a tire/wheel assembly, a run-flat support member, and a manufacturing method therefor. More specifically, the present invention relates to a tire/wheel assembly, a run-flat support member, and a manufacturing method therefor, which enable low-cost manufacturing of various sized tire/wheel assemblies and the like and also make it possible to achieve diversification of the run-flat performance at low cost.

In response to demands from the market, there have been many technologies proposed to allow a vehicle to run urgently for several hundreds of kilometers even when a pneumatic tire is punctured while the vehicle is running. Among these many proposals, technologies proposed in Japanese patent Laid-Open Publication No. 10-297226 and Published Japanese Translation of a PCT application No. 2001-519279 enable run-flat traveling by fitting a core onto a rim in the inner side of a cavity of a pneumatic tire that is assembled to the rim, and by supporting the punctured tire using the core.

The foregoing run-flat core includes a circular shell in which the outer circumferential side thereof serves as a support surface and the inner circumferential side thereof is opened so as to form two leg portions. Also, an elastic ring is fitted to both leg portions of the circular shell, thus the run-flat core is supported on the rim through the elastic ring. By using this run-flat core, a conventional wheel and rim can be used as they are without any particular modifications. Therefore, the run-flat core is advantageously adopted without causing confusion in the market.

However, in order to use the run-flat core in the market, the core has to be made suitable for each size of the rim or tire. Therefore, preparation of various kinds of equipment and the like such as molds for manufacturing is required, thus increasing the costs substantially. Moreover, when wanting to change the run-flat performance of the core, a new mold has to be made even if the size of the core is not changed. Accordingly, a cost increase in manufacturing becomes an inevitable problem as the run-flat performance is more diversified.

SUMMARY OF THE INVENTION

An object of the present invention is to provide a tire/wheel assembly which enables low-cost manufacturing of various sizes of the same and also diversified performance thereof. Another object of the present invention is to provide a run-flat support member which enables low-cost manufacturing of various sizes of the same and diversified performance thereof. Yet another object of the present invention is to provide a manufacturing method for the run-flat support member which enables low-cost manufacturing of various sizes of the same and also diversification of performance thereof.

In the tire/wheel assembly of the present invention for achieving the foregoing object, a run-flat support member is inserted into a cavity of a pneumatic tire. The run-flat support member includes a circular shell in which the outer circumferential side thereof is used as a support surface and the inner circumferential side thereof is opened to have two leg portions, and an elastic ring for supporting the ends of the two leg portions on the rim. This tire/wheel assembly is characterized in that the circular shell is formed by jointing side edges of at least two shell segments, each having a single convex circumferential surface.

Moreover, the run-flat support member of the present invention includes a circular shell in which the outer circumferential side thereof is used as a support surface and the inner circumferential side thereof has two leg portions, and an elastic ring for supporting the ends of the two leg portions on the rim. The run-flat support member is characterized in that the circular shell is formed by jointing side edges of at least two shell segments, each having a single convex circumferential surface.

Further, in the manufacturing method for the run-flat support member according to the present invention, the run-flat support member includes a circular shell in which the outer circumferential side thereof is used as a support surface and the inner circumferential side thereof is opened to have two separate leg portions. The manufacturing method is characterized in that the circular shell is formed by jointing side edges of at least two shell segments, each having a single convex circumferential surface.

According to the present invention, the circular shell thus configuring a main part of the run-flat support member is formed by combining at least two shell segments, each having a single convex circumferential surface. Hence, if a plurality of types of shell segments having different sizes, etc. are prepared, it makes it possible to configure various run-flat support members having different sizes and performance by combining these segments as appropriate. Specifically, in the case of manufacturing the plurality of types of run-flat support members, it is possible to use the number of shell segments amounting to less than the total number of run-flat support member types to be manufactured, thereby reducing the number of required molds for forming as a whole, and enabling low-cost manufacturing.

DESCRIPTION OF THE PREFERRED EMBODIMENTS

Figure 1:
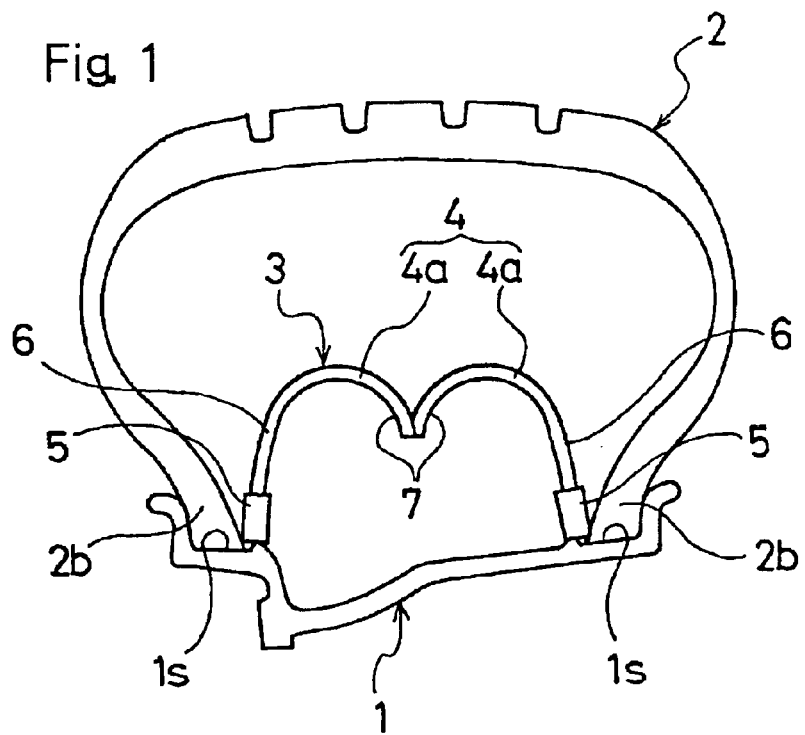
FIG. 1 is a cross-sectional view along a meridian line showing a main part of the tire/wheel assembly according to an embodiment of the present invention.

In the present invention, a run-flat support member is formed as a circular member which is inserted into a cavity of a pneumatic tire. This run-flat support member is formed to have its outer diameter smaller than the inner diameter of the cavity of the pneumatic tire in order to maintain a certain distance from the inner surface of the cavity. The inner diameter of the run-flat support member is formed to be approximately the same as the inner diameter of a bead. Then, the run-flat support member is inserted into the inside of the pneumatic tire and assembled to a wheel together with the pneumatic tire using through a rim, thus configuring the tire/wheel assembly. When the pneumatic tire is punctured while the vehicle with the tire/wheel assembly fitted thereto is running, the tire flattened out due to the puncture is supported on the outer circumferential surface of the run-flat support member, thus making run-flat traveling possible.

The above-described run-flat support member is constituted of the circular shell and elastic rings as main members.

In the circular shell, a continuous support surface for supporting a punctured tire is formed in the outer circumferential side (outer diameter side), and the inner circumferential side (inner diameter side) is in an open shape having two leg portions serving as respective sidewalls on the right and left sides. The support surface on the outer circumferential side is formed to have a curved surface that is convex toward the outer diameter side, when viewed in the cross section profile that is orthogonal to a circumferential direction of the tire. The number of convex portions on the curved surface aligned in an axial direction of the tire can be single, but preferably two or more. By forming the support surface in this way so as to align two or more convexly curved portions, contact of the support surface with the inner wall of the tire is distributed amongst two or more points. Accordingly, local wear on the inner wall of the tire can be reduced, allowing extension of an enduring distance of run-flat travelling.

The elastic ring is fitted to each end of the two leg portions provided on the inner diameter side of the circular shell, and is abutted on rim seats on the right and left sides so as to support the circular shell. Since this elastic ring is made of rubber or elastic resin, the elastic ring not only mitigates vibration of and impact upon the circular shell, but is also slip resistant with respect to the rim seats so that the circular shell is stably supported.

Due to the fact that the run-flat support member has to support a vehicle weight with a punctured tire, the circular shell is made of a hard material. For the constituent material of the circular shell, metal or resin, etc. is used. As for the metal, for example, steel or aluminum, etc. is listed. The resin can be any of thermoplastic resin and thermosetting resin. Examples of the thermoplastic resin are nylon, polyester, polyethylene, polypropylene, polystyrene, polyphenylene sulfide and ABS. Examples of the thermosetting resin are, epoxy resin, unsaturated polyester resin, etc. The single resin can be used and can also contain reinforcing fibers compounded therein to be used as fiber-reinforced resin.

Under the aforementioned configuration as a precondition, the run-flat support member of the present invention is configured of at least two shell segments by jointing the side edges thereof. Additionally, each of the shell segments is configured to have a single convexly curved surface on the circumferential surface thereof. Accordingly, when forming a circular shell by jointing the plurality of shell segments, the convexly curved surfaces of the same number as that of the jointed shell segments are aligned in an axial direction on the circumferential surface of the circular shell.

When the plurality of shell segments are jointed at their side edges as described above, rigidity of the jointed portion is increased, and thus rigidity of the circular shell is enhanced, whereby improving durability of the run-flat support member. As for a joint method, there is butt joint or overlap joint. Further effects can be exerted on the above-mentioned rigidity improvement in the case of overlap joint in particular Moreover, combinations of the plurality of shell segments are not limited to those by the shell segments of the same size, and it is possible to have combinations using the different-sized shell segments. By selecting the sizes of the shell segments like this, it becomes possible to make the run-flat support member of quite a number of sizes. Furthermore, it is not required that the materials of the combined shell segments are the same, and those made of different materials can be combined together. Combinations of the shell segments made of different materials as above makes it possible to achieve the lightweight run-flat support member and improved vibration characteristics thereof.

Further, in the present invention, when jointing the plurality of shell segments, it is possible to joint the side edges thereof directly, but they can also be indirectly jointed by placing a spacer between them. When this kind of indirect joint with a spacer interposed is employed, the run-flat support members of various sizes can be made by selecting the thickness of the spacer as appropriate. Moreover, the material of the spacer can be any of metal, resin, or rubber, and is not required to be the same as those of the shell segments. If the material of the spacer is metal, the rigidity of the run-flat support member can be enhanced. On the other hand, if the material of the spacer is resin or rubber, the impact or vibration absorbing characteristics of the run-flat support member is enhanced.

The joint means for the side edges of the shell segments is not particularly limited. For example, in the case where the material of the shell is metal, it is possible to utilize welding, soldering, or adhesive bonding, etc. It is also possible to employ a caulking method used for fastening an edge of a can. Specifically, one edge is held in the folded portion of the other edge, and then caulking over the folded portion is performed with strong pressure. Moreover, in the case where the material of the shell is resin, joint can be done by fusion and adhesive.

Hereinafter, a detailed description of the present invention will be provided based on embodiments illustrated in the drawings.

FIG. 1 is a cross-sectional view along a meridian line showing a main part of the tire/wheel assembly according to an embodiment of the present invention.

The reference number 1 denotes a rim on the circumference of a wheel, the reference number 2 denotes a pneumatic tire, and the reference number 3 denotes a run-flat support member. The rim 1, pneumatic tire 2, and run-flat support member 3 are formed in a circular shape coaxially about the rotation axis of the wheel (not shown).

The run-flat support member 3 is configured of a circular shell 4 made of a hard material such as metal or resin, and elastic rings 5 made of an elastic material such as high hardness rubber or elastic resin. The circular shell 4 is formed to have a curved support surface with two convex portions on the circumferential side thereof, and the support surface is spaced apart from the inner surface of the pneumatic tire 2 when the tire 2 is under a normal condition, and supporting the flattened tire when a puncture occurs. Further, the inner circumferential side of the circular shell 4 is opened to have two leg portions 6, 6 as sidewalls respectively, and elastic rings 5, 5 are assembled to the ends of the leg portions 6, 6.

The circular shell 4 is integrally formed by jointing the side edges of two shell segments 4a, 4a. Each shell segment 4a has a single convexly curved surface on the circumferential side. When two shell segments 4a, 4a are jointed, each of the convexly curved surfaces is aligned in an axial direction. The joint means is preferably welding when the material of the shell is metal, and fusion or adhesive is preferable when the material thereof is resin.

The joint portion of two shell segments 4a, 4a are formed so that the side surfaces of the side edge portions 7, 7 that mutually face each other physically meet. Additionally, the sidewalls in the opposite side are extended in a radially inner direction, forming the leg portions 6, 6. The elastic rings 5, 5 are fitted to the ends of the leg portions 6, 6. The run-flat support member 3 having the circular shell 4 thus formed is inserted into the pneumatic tire 2, and the elastic rings 5, 5 are fitted to rim seats 1s, 1s of a rim 1 together with beads 2b, 2b simultaneously.

Figure 6:
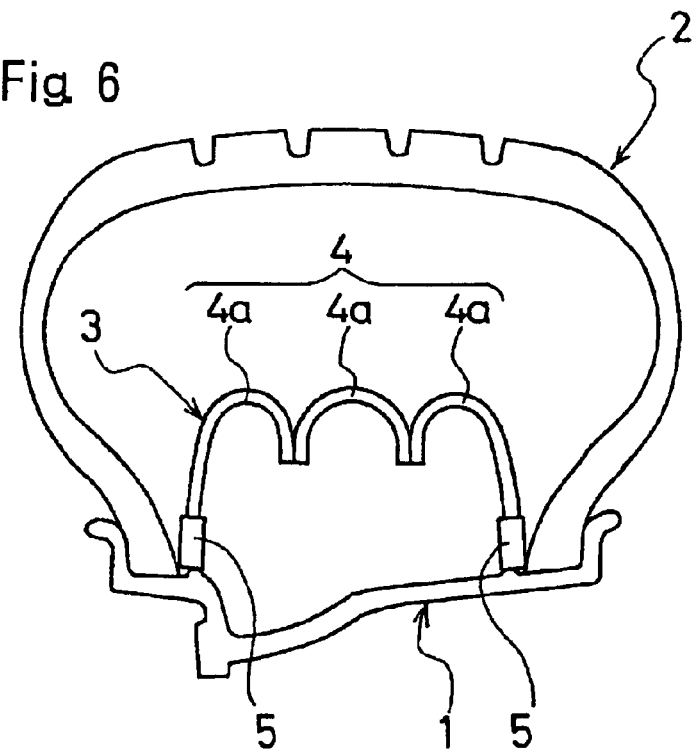
FIG. 6 is a cross-sectional view along a meridian line showing a main part of the tire/wheel assembly according to yet another embodiment of the present invention.

In the foregoing embodiment, an exemplified case was that two shell segments 4a on the right and left, respectively, are joined together. However, the number of shell segments 4a is not limited to two, and three shell segments as an example shown in FIG. 6, or a greater number of them can be joined together.

Figure 2:
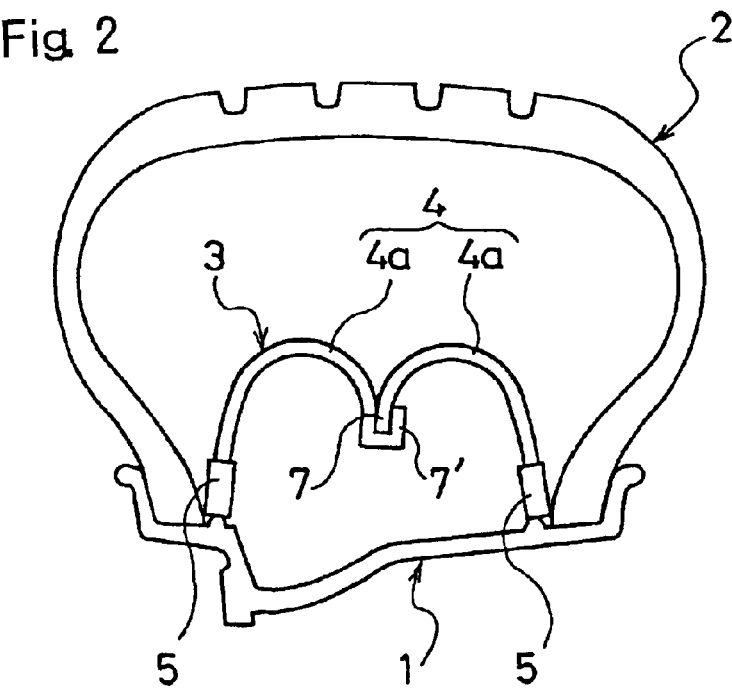
FIG. 2 is a cross-sectional view along a meridian line showing a main part of the tire/wheel assembly according to another embodiment of the present invention.
Figure 3:
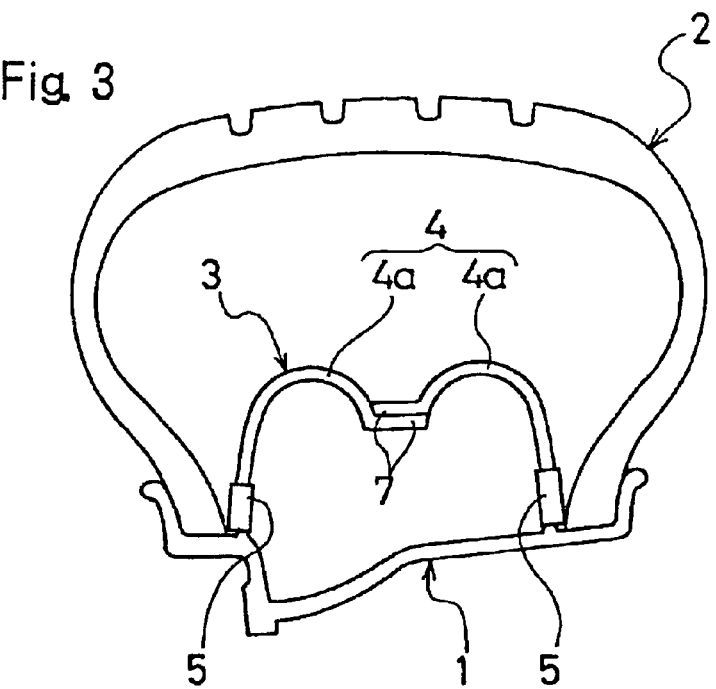
FIG. 3 is a cross-sectional view along a meridian line showing a main part of the tire/wheel assembly according to yet another embodiment of the present invention.

The run-flat support member 3 of the present invention improves the rigidity of the portion where the side edges 7, 7 of the shell segments are jointed and enhances the durability of the circular shell 3, as described above. A manner used in jointing the side edges 7, 7 is not particularly limited. It is possible to joint the side edges in a manner, for example, that one edge 7 is held within the folded portion of the other edge 7, and then caulking over the folded portion is performed with strong pressure, as shown in FIG. 2. Alternatively, it is possible to use a manner that one of the side edges 7, 7 overlaps on the other and adhered together by either welding or adhesive.

During run-flat traveling of the tire/wheel assembly, a larger load is imposed on the circular shell 4 of the run-flat support member 3 on the outer side of the vehicle. Therefore, in the configuration that two or more shell segments 4a are jointed, it is preferable that the shell segment disposed on the outer side of the vehicle have higher rigidity than that of the shell segment disposed on the inner side of the vehicle, thus improving the durability of the run-flat support member 3. A method for increasing the rigidity of the shell segment on the outer side of the vehicle is to use a material having higher rigidity than that of the shell segments on the inner side of the vehicle, or to increase the thickness or to narrow the width of the shell segment on the outer side of the vehicle when the same material is used.

Figure 4:
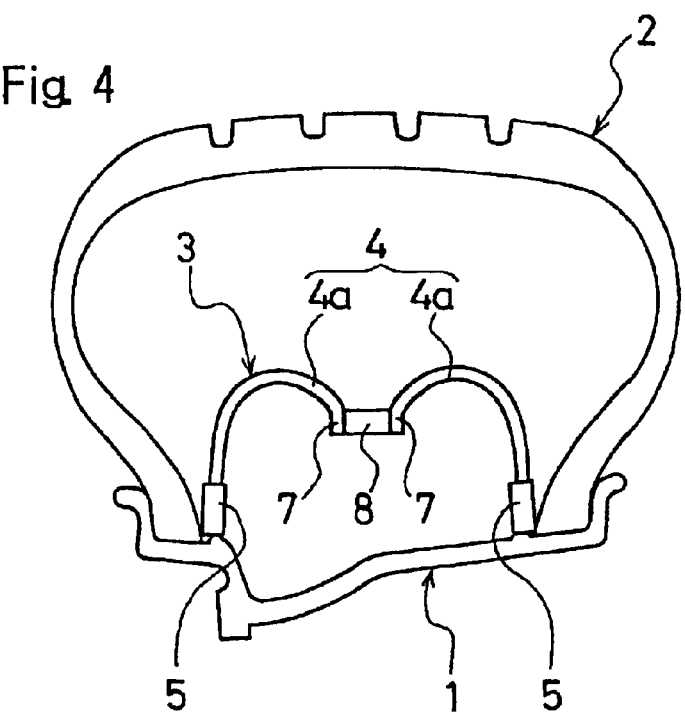
FIG. 4 is a cross-sectional view along a meridian line showing a main part of the tire/wheel assembly according to yet another embodiment of the present invention.

Alternatively, as an example in FIG. 4, when jointing the side edges 7, 7 of the two shell segments 4a, 4a, a relatively thick circular spacer 8 is placed between the side edges 7, 7. This makes it possible to further increase the effect of diversification in sizes and performance of the run-flat support member 3.

Figure 5:
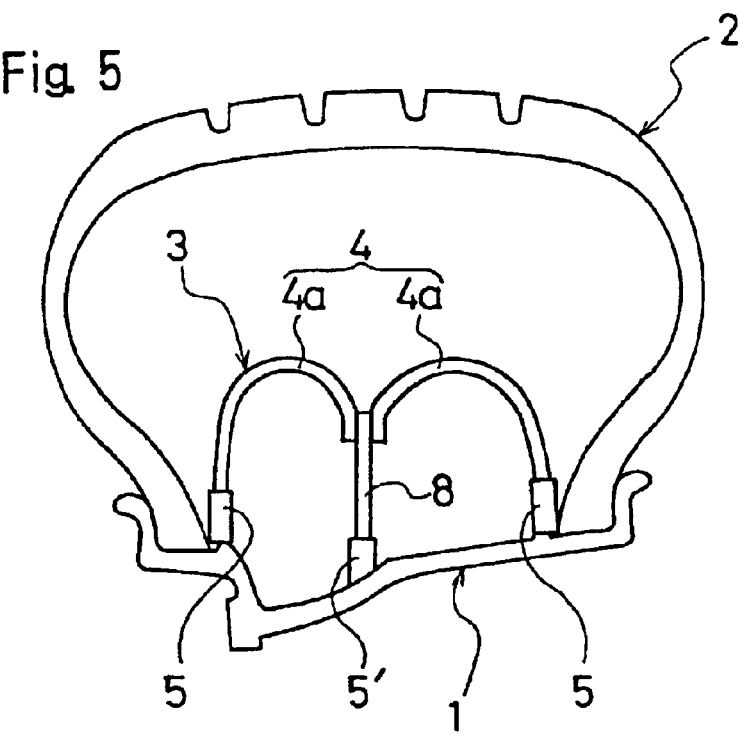
FIG. 5 is a cross-sectional view along a meridian line showing a main part of the tire/wheel assembly according to yet another embodiment of the present invention.

Specifically, it is possible to make the run-flat support members of various sizes by changing the width of the spacer 8 to various dimensions. In addition, as shown in an example of FIG. 5, the spacer 8 is extended in a radially inner direction, and the elastic ring 5' is fitted to the end of the spacer 8 to be supported by the rim 1, thus further increasing the rigidity of the circular shell 3 and thereby achieving improved durability of the same. A material of the spacer 8 can be any of metal, resin, or rubber, and is not necessarily the same as that of the shell segments. In the case of using a metal material for the spacer, the rigidity of the run-flat support member can be improved. On the other hand, when resin or rubber is used, impact or vibration absorbing characteristics of the run-flat support member can be improved.

As described earlier, the run-flat support member 3 is formed by combining at least two shell segments 4a, 4a. Therefore, when the plurality of types of segments having different sizes, etc., are prepared as the shell segments 4a, it is possible to configure various types of run-flat support members that are different with each other in size or performance, by selecting those segments as appropriate and jointing them together. Specifically, it is possible to make the plurality of types of run-flat support members by combining the number of shell segments amounting to less than the total number of run-flat support member types. Accordingly, the number of required molds for forming is reduced as a whole, thus enabling low-cost manufacturing.

According to the present invention as described earlier, the circular shell is formed by combining at least two shell segments. Therefore, when the plurality of types of shell segments that are mutually different in size or the like are prepared, it is possible to make the run-flat support members having quite a number of different sizes or performance by changing the combinations of the shell segments as appropriate, thereby enabling low-cost manufacturing of the run-flat support members.

What is claimed is:

1. A tire/wheel assembly in which a run-flat support member is inserted into a cavity of a pneumatic tire, the run-flat support member including a circular shell in which an outer circumferential side thereof is used as a support surface and an inner circumferential side thereof is opened to have two leg portions, and an elastic ring supporting the ends of the two leg portions on a rim, wherein the circular shell is formed by jointing side edges of at least two shell segments, each having a single convex circumferential surface.

2. The tire/wheel assembly according to claim 1, wherein a spacer is placed between the side edges of the shell segments.

3. The tire/wheel assembly according to claim 2, wherein the spacer is extended to a rim of a wheel and supported by the rim.

4. The tire/wheel assembly according to any one of claims 1 to 3, wherein at least two of the shell segments are made into a combination of the shell segments, each being made of different constituent materials.

5. The tire/wheel assembly according to any one of claims 1 to 3, wherein when the tire/wheel assembly is fitted to a vehicle, the shell segment disposed at an outer side of the vehicle has higher rigidity than that of the shell segment disposed at an inner side of the vehicle.

6. A run-flat support member, comprising:

a circular shell in which an outer circumferential side thereof is used as a support surface and an inner circumferential side thereof is opened to have two leg portions; and an elastic ring which supports ends of the two leg portions on a rim, wherein the circular shell is formed by jointing side edges of at least two shell segments, each having a single convex circumferential surface.

7. The run-flat support member according to claim 6, wherein a spacer is placed between the side edges of the shell segments.

8. The run-flat support member according to claim 7, wherein the spacer is extended to a rim of a wheel and adjusted be a length which can be supported by the rim.

9. The run-flat support member according to any one of claims 6 to 8, wherein at least two of the shell segments are made into a combination of the shell segments, each being made of different constituent materials.

10. A manufacturing method for a run-flat support member including a circular shell in which an outer circumferential side thereof is used as a support surface and an inner circumferential side thereof is opened to have two leg portions, wherein the circular shell is formed by jointing side edges of at least two shell segments to each other, each shell segment having a single convex circumferential surface.

* * * * *